(12) United States Patent
Imada et al.

(10) Patent No.: US 7,742,087 B2
(45) Date of Patent: Jun. 22, 2010

(54) IMAGE PICKUP DEVICE

(75) Inventors: Katsumi Imada, Nara (JP); Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 11/720,684

(22) PCT Filed: Dec. 12, 2005

(86) PCT No.: PCT/JP2005/022792

§ 371 (c)(1),
(2), (4) Date: Jun. 1, 2007

(87) PCT Pub. No.: WO2006/064770

PCT Pub. Date: Jun. 22, 2006

(65) Prior Publication Data

US 2008/0211956 A1  Sep. 4, 2008

(30) Foreign Application Priority Data

Dec. 16, 2004 (JP) ............................... 2004-363867

(51) Int. Cl.
*H04N 5/225* (2006.01)
*H04N 5/217* (2006.01)
(52) U.S. Cl. ...................... 348/262; 348/218.1; 348/241
(58) Field of Classification Search ........................ None
See application file for complete search history.

(56) References Cited

U.S. PATENT DOCUMENTS

| 6,097,430 | A | * | 8/2000 | Komiya et al. ........... 348/218.1 |
| 6,373,518 | B1 | | 4/2002 | Sogawa |
| 6,882,368 | B1 | | 4/2005 | Suda |
| 2002/0067416 | A1 | | 6/2002 | Yoneda et al. |
| 2002/0122124 | A1 | | 9/2002 | Suda |

FOREIGN PATENT DOCUMENTS

| JP | 2002-330332 | 11/2002 |
| JP | 3397758 | 2/2003 |
| JP | 2003-283907 | 10/2003 |

OTHER PUBLICATIONS

Aizawa, et al., "Acquisition of Super High Definition Pictures", The Journal of the Institute of Image Electronics Engineers of Japan, Mar. 4, 1990, p. 23-28.

* cited by examiner

*Primary Examiner*—Justin P Misleh
(74) *Attorney, Agent, or Firm*—Hamre, Schumann, Mueller & Larson, P.C.

(57) ABSTRACT

A plurality of imaging regions (104, 105 and 106) capture a plurality of images, respectively, via a plurality of imaging optical systems (101, 102 and 103) corresponding one to one to the plurality of imaging regions. An image combining means (115) eliminates a difference among the plurality of images and combines the plurality of images into a single image. Thereby, it is possible to obtain a combined image of high quality.

8 Claims, 16 Drawing Sheets

IMAGE PICKUP DEVICE

TECHNICAL FIELD

The present invention relates to an image pickup device that combines a plurality of images obtained using a plurality of imaging optical systems into a single high definition image by performing a parallax correction.

BACKGROUND ART

As the principle method of obtaining a single high definition image by combining a plurality of images obtained using a plurality of imaging optical systems (multiple-lens imaging system), for example, the method disclosed in "Acquisition of Super High Definition Pictures" (Kiyoharu Aizawa et al., the Journal of the Institute of Image Electronics Engineers of Japan, 90-03-04, p 23 to 28) is known. According to this method, a single high definition image is obtained by superimposition of two images obtained using two imaging optical systems such that the pixels of one image are interposed between the pixels of the other image.

The same applies when this principle is applied to color images. Specifically, as the method of obtaining high definition color images, there are the following methods: one is to employ a plurality of imaging optical systems equipped with color filters arranged in the Bayer arrangement, a stripe arrangement or the like; and another is to employ a plurality of imaging optical systems having different chromatic sensitivity characteristics.

A typical multiple-lens image pickup device will be described with reference to FIG. 15. In FIG. 15, a plurality of imaging optical systems 101, 102 and 103 form object images on a plurality of image sensors 104, 105 and 106, respectively. The plurality of image sensors 104, 105 and 106 have different imaging and light-receiving characteristics. The image sensor 104 captures a red (R) wavelength region, the image sensor 105 captures a green (G) wavelength region, and the image sensor 106 captures a blue (B) wavelength region. A plurality of images captured by the plurality of image sensors 104, 105 and 106 are image-processed by an R signal processing circuit 107, a G signal processing circuit 108 and a B signal processing circuit 109, respectively, and combined and outputted as a color image by an image combining process circuit 110.

In this multiple-lens image pickup device, the plurality of imaging optical systems 101, 102 and 103 have different optical axes, and they are arranged to be symmetrically inclined at an angle θ (radiation angle) with respect to the normal line of the object placed at a predetermined position. For example, with the radiation angle θ being set and fixed to be optimal for the object position b of FIG. 15, if an object placed at the position a or c is captured, because the radiation angle θ for the object position a or c is different from the optimal radiation angle, a shift occurs among the images captured by the image sensors 104, 105 and 106.

This will be described with reference to FIGS. 16A, 16B and 16C. FIGS. 16A, 16B and 16C are diagrams showing combined images obtained by the multiple-lens image pickup device shown in FIG. 15. FIG. 16A is a combined image obtained when the object placed at the position a is captured. FIG. 16B is a combined image obtained when the object placed at the position b is captured. FIG. 16C is a combined image obtained when the object placed at the position c is captured. In this example, the object is assumed to be a white circular object captured on a black background.

When the object is placed at the position a, because the radiation angles of the plurality of imaging optical systems 101, 102 and 103 are not appropriate, the red image (R) and the blue image (B) shift to the right and left from the green image as shown in FIG. 16A. The shifted portions are outputted as color drift in the combined image. More specifically, the portion from which the blue image has shifted becomes yellow (Ye) due to the combination of the green image and the red image. The portion from which the red image has shifted becomes cyan (Cy) due to the combination of the green image and the blue image. The portion from which the blue image and the red image have shifted becomes green (G). In this example, because the optical axes of the plurality of imaging optical systems 101, 102 and 103 are arranged one-dimensionally, in the combined image, a one-dimensional shift occurs along the arrangement direction, but when they are arranged two-dimensionally, a two-dimensional shift occurs. When a two-dimensional shift occurs in a combined image, the portion from which the green image has shifted becomes magenta (Mg) due to the combination of the red image and the blue image.

When the object is placed at the position b, because the radiation angles of the plurality of imaging optical systems 101, 102 and 103 are appropriate, a high definition image without color drift as shown in FIG. 16B is outputted.

When the object is placed at the position c, a combined image as shown in FIG. 16C is obtained in which the red image and the blue image are shifted in the opposite direction to that of the combined image (see FIG. 16A) obtained when the object is placed at the position a.

Moreover, if there is even a slight difference (e.g., a variation in magnification, inclination, distortion, etc.) among a plurality of images obtained by the image sensors 104, 105 and 106, it will be difficult to correct the parallax accurately, and the image quality, particularly, the resolution of the combined image, will be very poor.

To cope with this, Japanese Patent No. 3397758 discloses, in order to prevent the variation in magnification, to set the focal length of a first imaging optical system corresponding to a first wavelength and that of a second imaging optical system corresponding to a second wavelength to be equal. However, from the actual production point of view, it would be extremely difficult to set the focal lengths to be exactly equal, and particularly when the optical systems correspond to different wavelength bands, it is essentially impossible.

DISCLOSURE OF INVENTION

Problem to be Solved by the Invention

As described above, in an image pickup device that combines a plurality of images obtained by a multiple-lens imaging system into a single image, if there is even a slight difference in magnification, inclination, distortion, etc., among the plurality of images obtained by the optical systems, it will be difficult to correct the parallax from these images accurately. As a result, the image quality, particularly, the resolution of the combined image will be very poor.

In view of the conventional problem described above, it is an object of the present invention to provide an image pickup device including a multiple-lens imaging system and being capable of combining a plurality of images having a parallax into an image of high quality.

Means for Solving Problem

The image pickup device of the present invention comprises: a plurality of imaging optical systems; a plurality of imaging regions that correspond one to one to the plurality of imaging optical systems and capture a plurality of images via the plurality of imaging optical systems, respectively; and an image combining means having a function of eliminating a difference among the plurality of images and a function of combining the plurality of images into a single image.

Effects of the Invention

According to the image pickup device of the present invention, because differences among a plurality of images except for parallax can be eliminated before combining them, the plurality of images can be combined with high accuracy, and a combined image of high quality can be obtained.

DESCRIPTION OF THE PREFERRED EMBODIMENTS

In the above image pickup device of the present invention, it is preferable that the function of eliminating a difference among the plurality of images is a function of equalizing the magnification of the plurality of images.

In this case, it is preferable that the image pickup device further comprises a recording unit that stores information on the magnification of the plurality of imaging optical systems, and that the image combining means equalizes the magnification of the plurality of images using the magnification information of the plurality of imaging optical systems.

Alternatively, it is preferable that the image pickup device further comprises a recording unit that stores information on the focal length of the plurality of imaging optical systems, and that the image combining means equalizes the magnification of the plurality of images using the focal length information of the plurality of imaging optical systems.

In the above image pickup device of the present invention, it is preferable that the function of eliminating a difference among the plurality of images is a function of equalizing the inclination of the plurality of images.

In this case, it is preferable that the image pickup device further comprises a recording unit that stores information on the inclination of the plurality of imaging regions, and that the image combining means equalizes the inclination of the plurality of images using the inclination information of the plurality of imaging regions.

In the above image pickup device of the present invention, it is preferable that the function of eliminating a difference among the plurality of images is a function of equalizing the distortion of the plurality of images.

In this case, it is preferable that the image pickup device further comprises a recording unit that stores information on the amount of distortion of the plurality of imaging optical systems, and that the image combining means equalizes the distortion of the plurality of images using the information on the amount of distortion of the plurality of imaging optical systems.

Hereinafter, embodiments of the present invention will be described with reference to the drawings.

Figure 1:
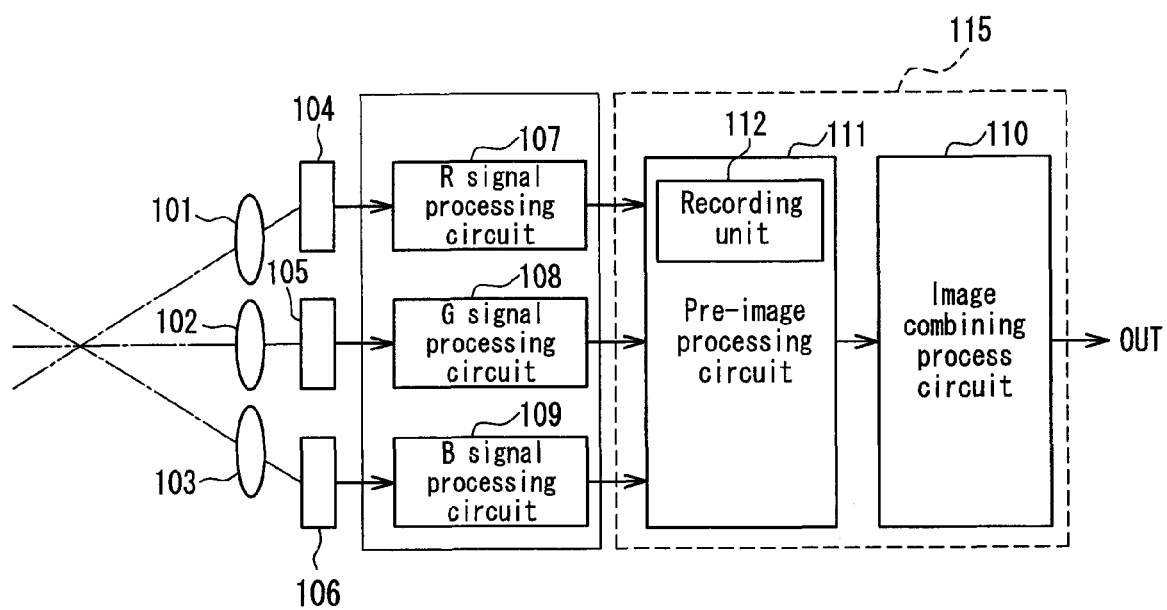
FIG. 1 is a block diagram showing an overall construction of an image pickup device according to an embodiment of the present invention.
Figure 15:
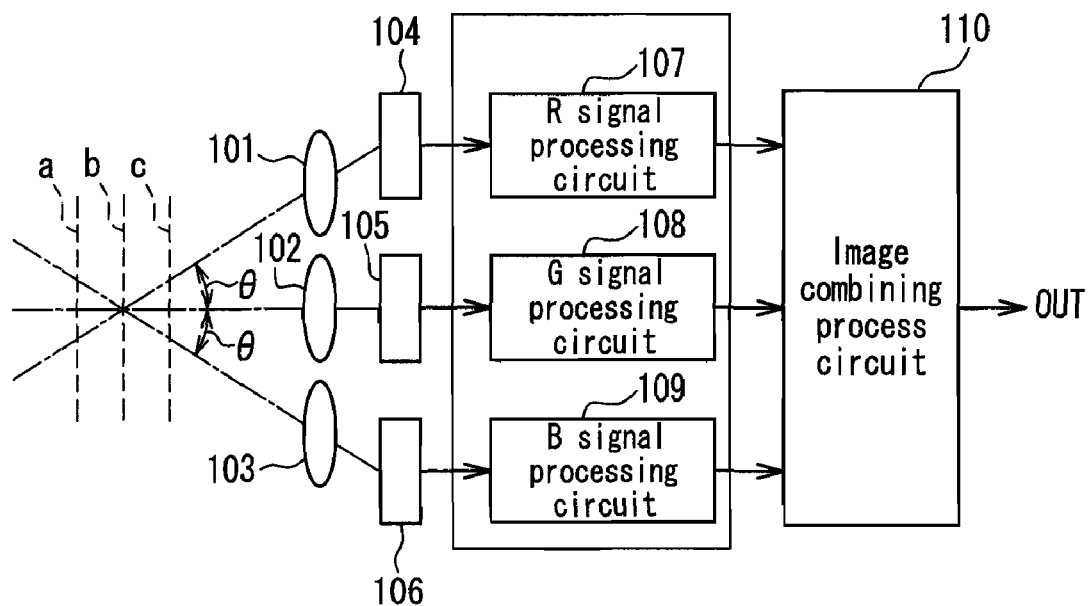
FIG. 15 is a block diagram showing an overall constitution of a conventional multiple-lens image pickup device.
Figure 16A:
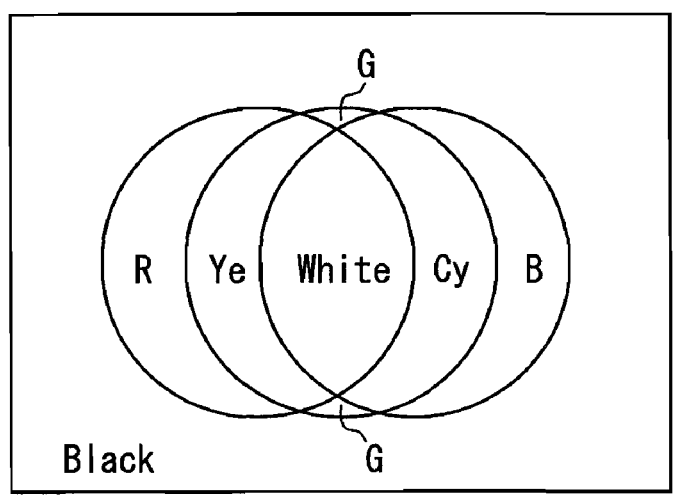
FIG. 16A is a diagram showing a combined image when a white circular object placed at the position a is captured by the multiple-lens image pickup device of FIG. 15.
Figure 16B:
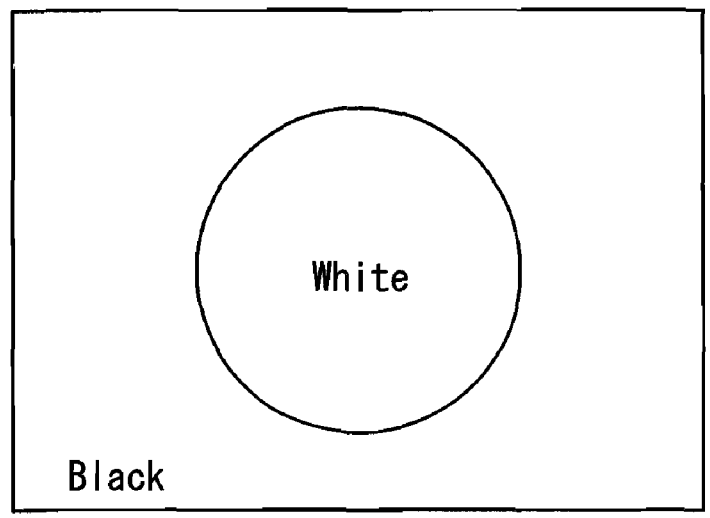
FIG. 16B is a diagram showing a combined image when a white circular object placed at the position b is captured by the multiple-lens image pickup device of FIG. 15.
Figure 16C:
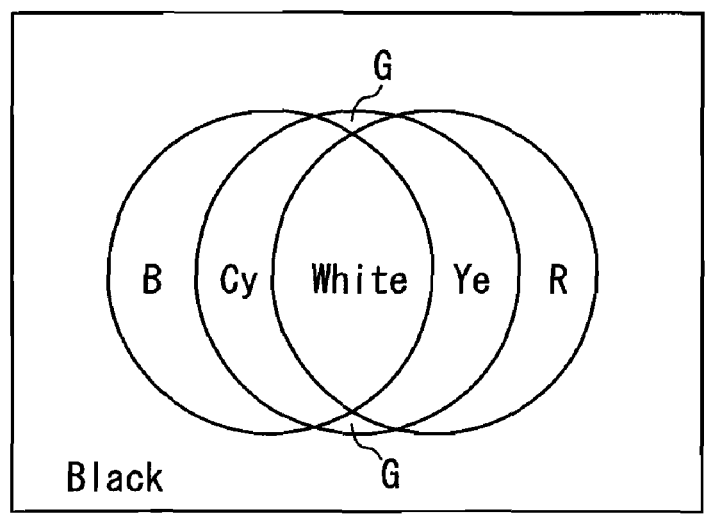
FIG. 16C is a diagram showing a combined image when a white circular object placed at the position c is captured by the multiple-lens image pickup device of FIG. 15.

FIG. 1 is a block diagram showing an overall construction of an image pickup device according to an embodiment of the present invention. The same reference numerals are given to the same components of the conventional image pickup device shown in FIG. 15.

In FIG. 1, a plurality of imaging optical systems 101, 102 and 103 form object images, respectively, on a plurality of image sensors 104, 105 and 106 corresponding one to one to the imaging optical systems. The plurality of image sensors 104, 105 and 106 have different imaging and light-receiving characteristics. The image sensor 104 captures a red (R) wavelength region. The image sensor 105 captures a green (G) wavelength region. The image sensor 106 captures a blue (B) wavelength region. As the method for allowing the image sensors to have different imaging and light-receiving characteristics, the image sensors may be allowed to have a wavelength dependence, or wavelength selectivity may be realized by inserting filters or the like.

A plurality of images captured by the plurality of image sensors 104, 105 and 106, respectively, are image-processed by an R signal processing circuit 107, a G signal processing circuit 108 and a B signal processing circuit 109, respectively. Subsequently, differences among the plurality of images except for parallax are eliminated by a pre-image processing circuit 111. Finally, the plurality of images are combined and outputted as a color image by an image combining process circuit 110.

In this embodiment, to simplify the description, an image combining means 115 that receives a plurality of image signals obtained from the plurality of image sensors 104, 105 and 106 and outputs a combined image signal will be described as comprising a pre-image processing circuit 111 having the function of eliminating a difference among a plurality of images and an image combining process circuit 110 having the function of combining a plurality of images processed by the pre-image processing circuit 111 into a single image (combined image), but, in the actual image pickup device, the pre-image processing circuit 111 and the image combining process circuit 110 need not be separated clearly.

Figure 2:
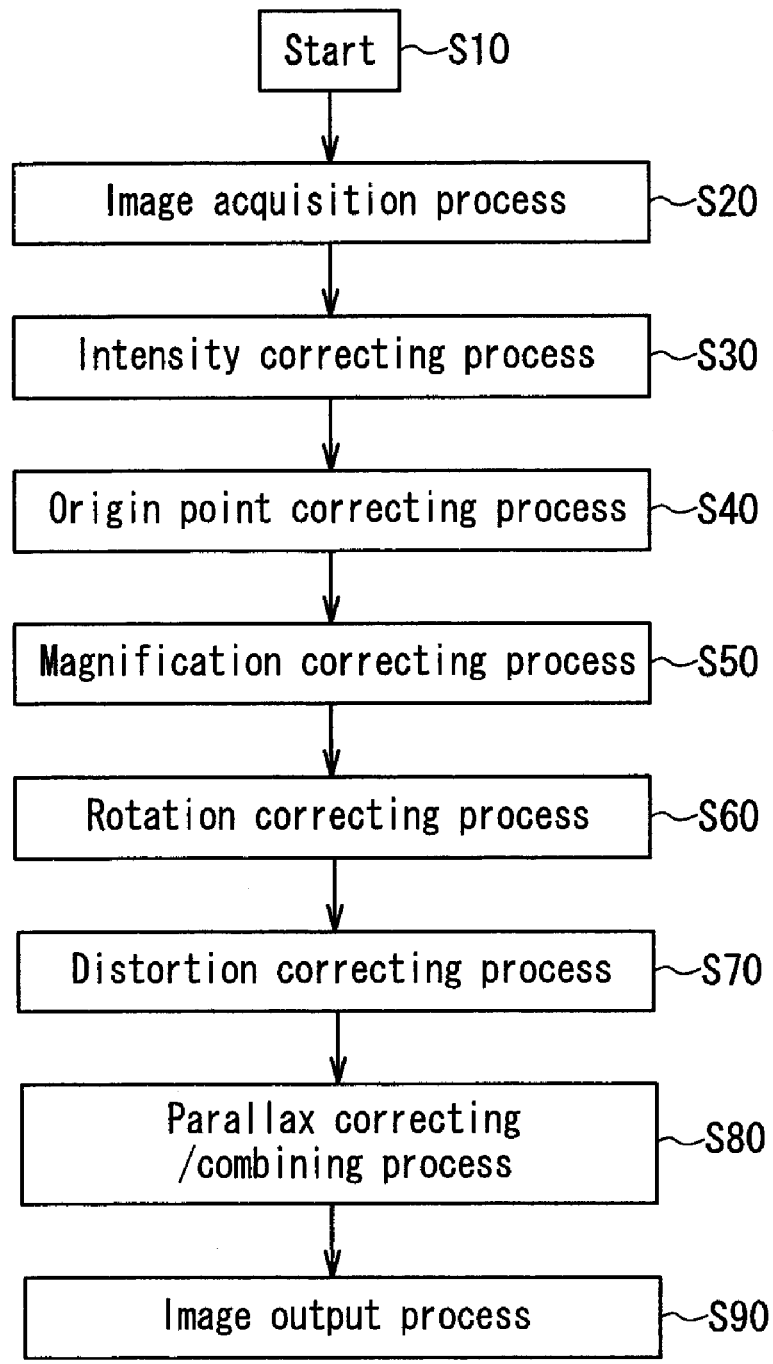
FIG. 2 is a flowchart showing the steps for capturing an image in an image pickup device according to an embodiment of the present invention.

FIG. 2 is a flowchart showing the steps for capturing an image of the image pickup device of this embodiment.

In step S10, image-capturing is started by the push of the image-capture button or the like.

In step S20, an image acquisition process is performed in which a plurality of images are received from the plurality of image sensors 104, 105 and 106. This process is executed by the signal processing circuits 107, 108 and 109.

In step S30, the plurality of images are subjected to an intensity correcting process in which the variation among the plurality of image sensors 104, 105 and 106 as well as the sensitivity are adjusted. This process is executed by the signal processing circuits 107, 108 and 109.

In step S40, the plurality of images are subjected to an origin point correcting process whose main purpose is to correct the deviation of the mounting position among the plurality of imaging optical systems 101, 102, 103 and the plurality of image sensors 104, 105, 106. This process is executed by the signal processing circuits 107, 108 and 109.

In step S50, the plurality of images are subjected to a magnification correcting process in which the magnification is equalized among the plurality of images. This process is executed by the pre-image processing circuit 111.

In step S60, the plurality of images are subjected to a rotation correcting process in which the inclination is equalized among the plurality of images. This process is executed by the pre-image processing circuit 111.

In step S70, the plurality of images are subjected to a distortion correcting process in which the distortion is equalized among the plurality of images. This process is executed by the pre-image processing circuit 111.

In step S80, a parallax correcting/combining process is performed in which the amount of parallax among the plurality of images is calculated, the obtained amount of parallax is corrected, and the plurality of images are combined into a single image (combined image). This process is executed by the image combining process circuit 110.

In step S90, an image output process is performed in which the combined image is outputted to a display device integrated with the image pickup device such as a liquid crystal display, or a device capable of outputting images via a connecting cable such a CRT, TV, PC (personal computer) or printer.

According to this embodiment, prior to the parallax correcting/combining process (step S80), the magnification, inclination and distortion are equalized among the plurality of images (step S50, S60 and S70). This makes the parallax correcting/combining process easy, and a high definition combined image can be obtained.

Although FIG. 2 is the flowchart intended eventually to output combined images, the distance to the object may be calculated using the triangulation principle from the amount of parallax obtained in step S80, the focal lengths of the plurality of imaging optical systems 101, 102 and 103, and the distances between the optical axes of the plurality of imaging optical systems 101, 102 and 103 used in the computation of the amount of parallax. Accordingly, in the image pickup device of this embodiment, it is possible to acquire a combined image together with information on the distance to the object at the same time. Alternatively, it is also possible to acquire only information on the distance to the object without performing the combining process of the plurality of images. In this case, by eliminating the difference among the plurality of images in steps S50, S60 and S70, the accuracy of the distance information can be improved.

A description will be given below for the magnification correcting process (step S50), the rotation correcting process (step S60) and the distortion correcting process (step S70) one by one.

Embodiment 1

In Embodiment 1, the magnification correcting process (step S50 of FIG. 2) for equalizing the magnification of the plurality of images will be described.

Figure 3:
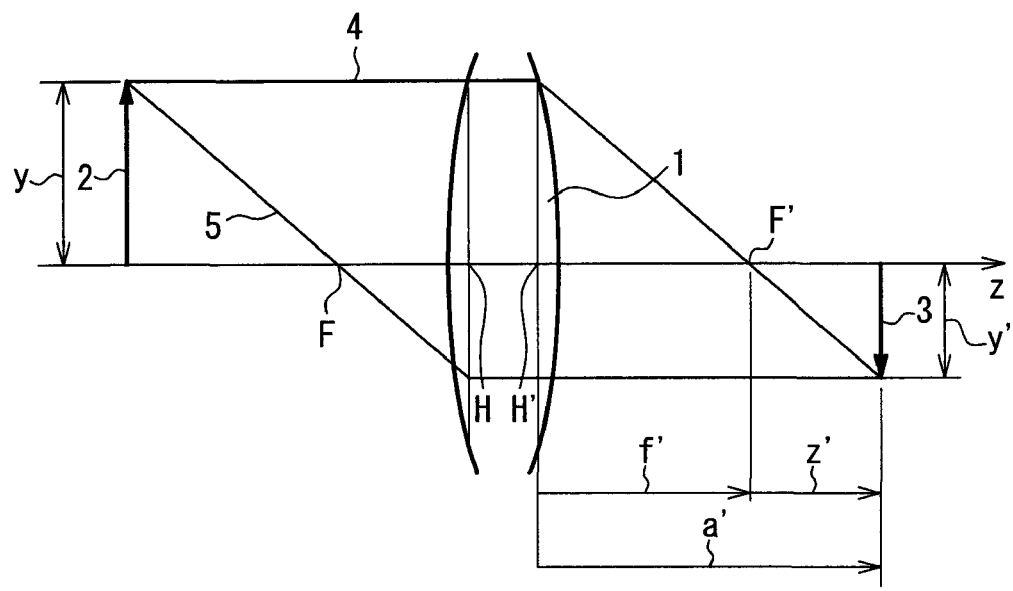
FIG. 3 is diagram showing a relationship between an object and an image in an image pickup device according to an embodiment of the present invention.

The reason why a variation in magnification occurs among the plurality of images is first described with reference to FIG. 3. FIG. 3 is a diagram illustrating a simplified relationship among a lens 1, an object 2 and an object image 3. Reference numerals 4 and 5 denote typical first and second beams from the object 2, z represents an optical axis, F represents a front focal point, F' represents a rear focal point, H represents a front principal point, H' represents a rear principal point, y represents the height of the object 2, y' represents the height of the object image 3, and f' represents a rear focal length. If the magnification is $\beta$, the magnification $\beta$ is defined by the following equation (1).

$$\beta = y'/y \quad (1)$$

If the distance from the rear focal point F' to the object image 3 is z', the equation (1) is transformed into the following equation (2).

$$\beta = -z'/f' \quad (2)$$

As can be seen from the equation (2), the magnification $\beta$ of the object image 3 changes with the change of the focal length f' of the lens 1.

Generally, in an image pickup device having a plurality of imaging optical systems, it is difficult to set the focal lengths of the lenses to be exactly equal. When the optical systems correspond to different wavelength bands, it is more difficult to set the focal lengths to be equal. For this reason, in the conventional image pickup device shown in FIG. 15, the magnifications of the plurality of images obtained via the plurality of imaging optical systems 101, 102 and 103 are slightly different. Accordingly, even if a perfect parallax correction is performed to combine the images, a slight variation among the plurality of images before the combining process prevents high frequency components from being reproduced in the combined image, and it is difficult to reproduce an image having a sufficient resolution with ensured high quality.

For this reason, before the parallax correction process and the image combining process, it is preferable to perform the magnification correcting process (step S50 of FIG. 2) for equalizing the magnification of the plurality of images.

The process in which the pre-image processing circuit 111 eliminates the difference in the magnification of the plurality of images will be described below by giving two examples.

According to a first example, when assembling the image pickup device, an image of a reference object is captured, the magnification of each imaging optical system is measured based on the size ratio between the object and its object image. This information is stored as a default value in the recording unit 112 in the pre-image processing circuit 111 (see FIG. 1). When capturing an image, the magnification correcting process (step S50 of FIG. 2) is performed for the plurality of images using this magnification information.

According to a second example, when assembling the image pickup device, the focal length of each imaging optical system is measured. This information is substituted into the above equation (2) to obtain a magnification. This information is stored as a default value in the recording unit 112 in the pre-image processing circuit 111 (see FIG. 1). When capturing an image, the magnification correcting process (step S50 of FIG. 2) is performed for the plurality of images using this magnification information. Alternatively, it is also possible to store information on the focal length of each imaging optical system in the recording unit 112, and when capturing an image, to subject the plurality of images to the magnification correcting process (step S50 of FIG. 2) using the focal length information.

Figure 4:
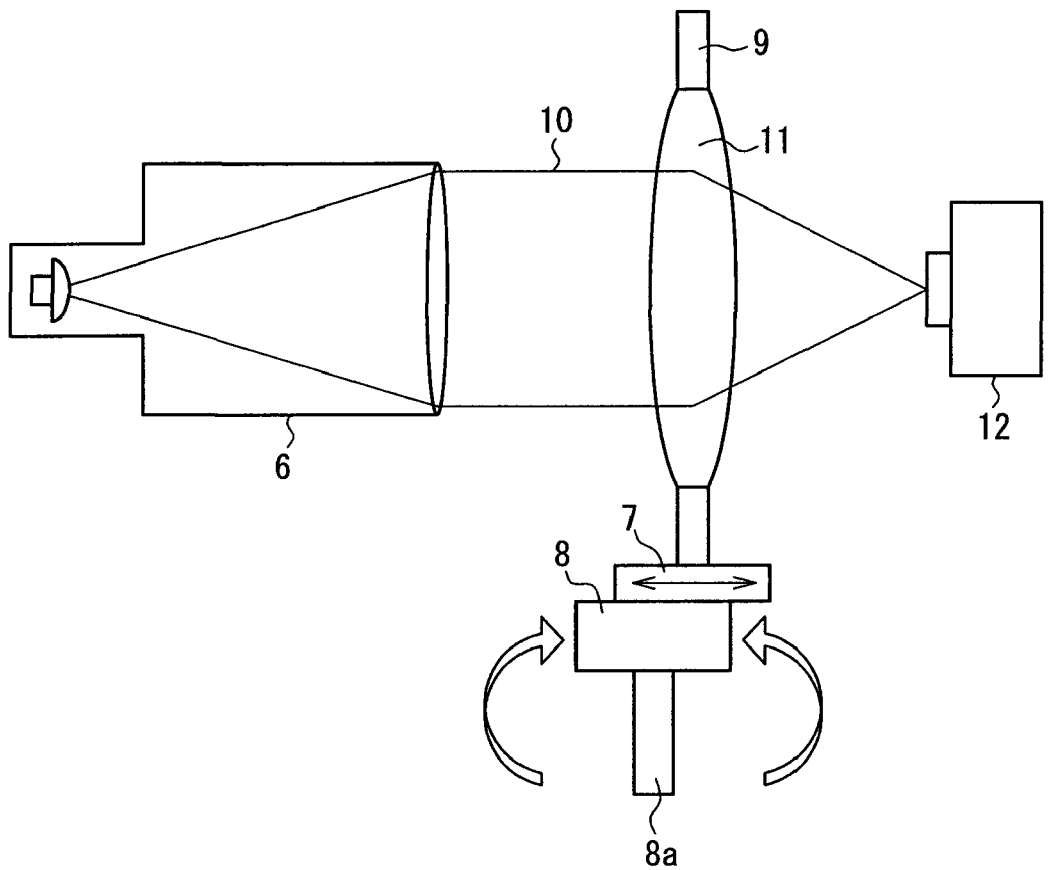
FIG. 4 is a schematic diagram of a device for measuring the focal length of an imaging optical system of an image pickup device according to an embodiment of the present invention.

An example of the method for accurately measuring the focal length of each imaging optical system when assembling the image pickup device will be shown. FIG. 4 is a diagram of a device for measuring the focal length of a lens 11 serving as an imaging optical system. Reference numeral 6 denotes a collimator, 7 denotes a movable stage, 8 denotes a rotatable stage, 9 denotes a lens holder, 10 denotes a parallel light, 11 denotes a test lens, and 12 denotes an image-capture camera. The test lens 11 is held by the movable stage 7 and the rotatable stage 8 with the aid of the lens holder 9. The movable stage 7 allows the test lens 11 to move in the optical axis direction, and the rotatable stage 8 allows the test lens 11 to rotate around the center rotation axis 8a in a plane perpendicular to a paper face including the optical axis. The collimator 6 is disposed on one side of the test lens 11, and the image-capture camera 12 is disposed on the other side thereof. The parallel light 10 produced by the collimator 6 enters the image-capture camera 12 through the test lens 11.

Figure 5A:
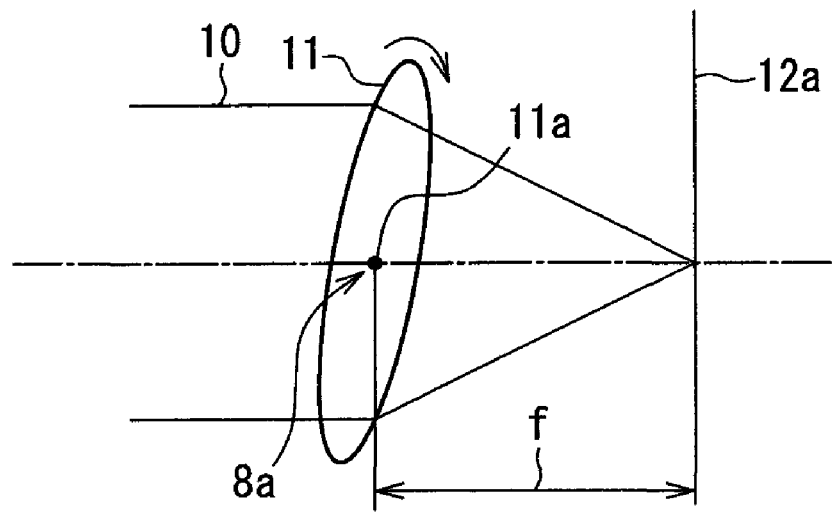
FIG. 5A is a diagram showing a method for measuring focal length when the principal point of a test lens is matched with the center rotation axis in the device of FIG. 4.

As shown in FIG. 5A, when the principal point 11a of the test lens 11 is matched with the center rotation axis 8a of the rotatable stage 8, even if the test lens 11 is rotated by the rotatable stage 8, the position of the image formed on the image-capture camera 12 does not change, and the distance from the center rotation axis 8a (or principal point 11a) to the capture plane 12a of the image-capture camera 12 is defined as the focal length f.

Figure 5B:
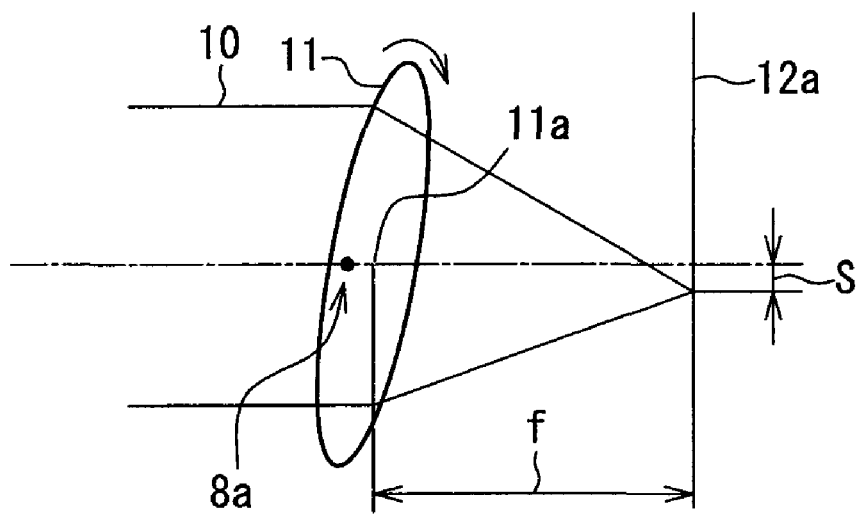
FIG. 5B is a diagram showing a method for measuring focal length when the principal point of a test lens is not matched with the center rotation axis in the device of FIG. 4.

However, as show in FIG. 5B, when the principal point 11a of the test lens 11 is not matched with the center rotation axis 8a of the rotatable stage 8, if the test lens 11 is rotated by the rotatable stage 8, the position of the image formed on the image-capture camera 12 shifts (shift amount S). In this case, the test lens 11 is moved in a direction parallel to the optical axis by the movable stage 7 with the test lens 11 being inclined, so as to bring the principal point 11a to match with the center rotation axis 8a. Thereby, the focal length f of the test lens 11 can be measured.

It is sufficient to perform the step of measuring the magnification or focal length of each imaging optical system only once during the initialization step of the assembly of the image pickup device or a product in which the image pickup device is incorporated.

As the magnification correcting process using the information on the magnification or focal length of the plurality of imaging optical systems, there are two methods: one is to reconstruct a new image in the pre-image processing circuit 111, to replace the original image signal with the new image signal and to transfer it to the subsequent image combining process circuit 110; and another is to allow the pre-image processing circuit 111 to control only the magnification or focal length information and to transfer the image signal together with the magnification or focal length information to the subsequent image combining process circuit 110. Because in either case similar effects are obtained with respect to the magnification correction of the images, no problem arises no matter which method is selected. In the following, a description will be given focusing on the former method.

Figure 6:
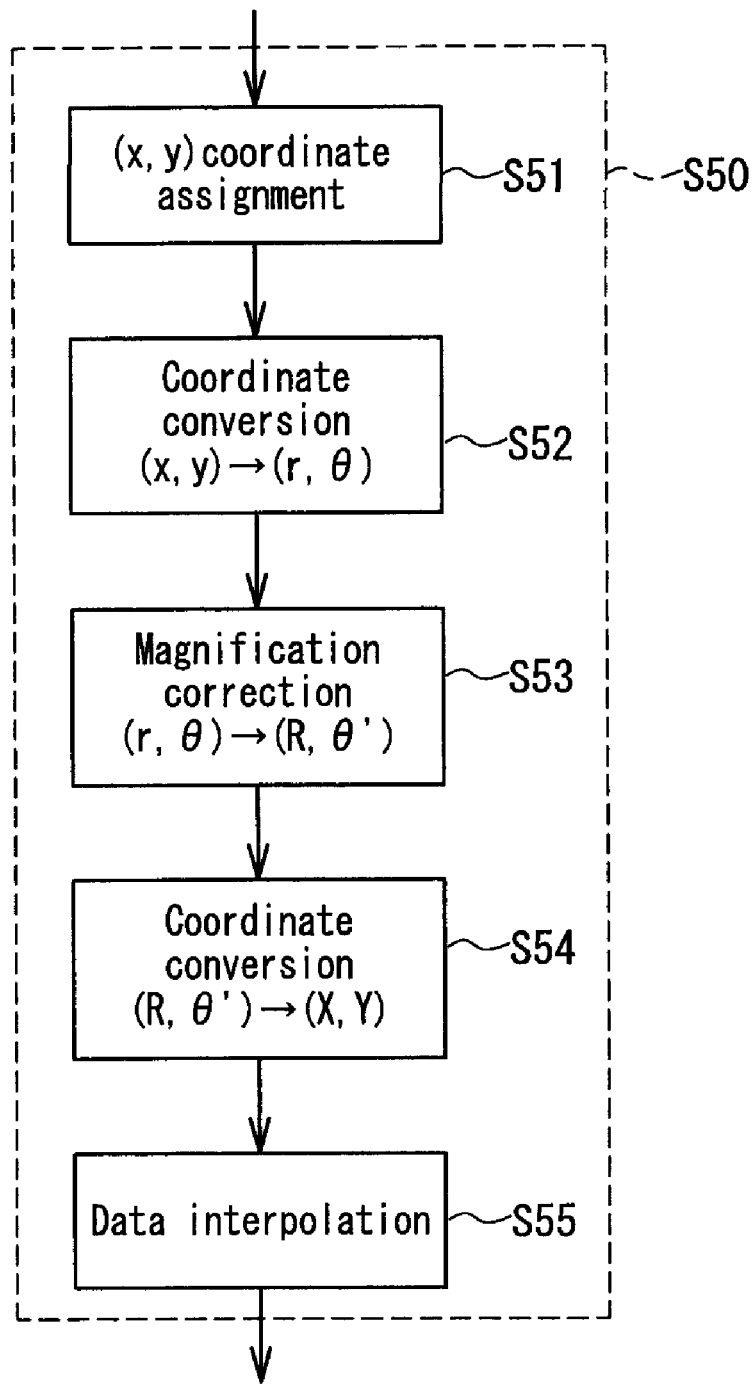
FIG. 6 is a flowchart showing the algorithm of magnification correcting process of an image pickup device according to an embodiment of the present invention.

With reference to FIG. 6, an example of the magnification correcting process (step S50 of FIG. 2) will be described which is performed every time image capturing is carried out.

In step S51, a plurality of images (the outputs of photodiodes (hereinafter referred to as "PDs")) captured via the plurality of imaging optical systems are stored temporarily in a two-dimensional information recording unit (not shown) of the pre-image processing circuit 111, and a coordinate (x, y) whose origin point is set at the origin point extracted in the origin point correcting process in step S40 (see FIG. 2) is assigned to the pixels forming each image.

In step S52, the (x, y) coordinate system is converted to a (r, θ) polar coordinate system whose origin point is at the center. This conversion can be performed easily by a coordinate conversion method using the following equations (3) and (4).

$$r = (x^2 + y^2)^{1/2} \quad (3)$$

$$\theta = \cos^{-1}(x/(x^2 + y^2)^{1/2}) \quad (4)$$

In step S53, the magnification correction is performed. Here, a case will be described in which the magnification of each imaging optical systems 101, 102, 103 is already known. By the magnification βi(i=1, 2, 3) of the imaging optical systems 101, 102, 103 stored in the recording unit 112, the coordinate (r, θ) is converted to a coordinate (R, θ') using the following equations (5) and (6).

$$R = r/\beta I \quad (5)$$

$$\theta' = \theta \quad (6)$$

It is also possible to use the magnification with respect to an image, that serves as the reference image, out of the plurality of images as the magnification βi(i=1, 2, 3) of the imaging optical systems 101, 102, 103. For example, if the magnification of the imaging optical system corresponding to the reference image is β1, the above equation (5) may be β1=β1/β1, β2=β2/β1, β3=β3/β1. However, when β2/β1>1 or β3/β1>1, the result obtained from the equation (5) will be R<r, the image obtained after the magnification correction will be smaller in size than the image extracted from the image sensor before the magnification correction, and the data of the periphery of the magnification-corrected image will be lost, causing a significant degradation in resolution of the periphery of the combined image. Accordingly, it is necessary to select the magnification (β1) of the imaging optical system corresponding to the reference image to satisfy β2/β1≦1, β3/β1<1.

By subjecting all the pixels forming an image to the equations (5) and (6), it is possible to obtain a magnification-corrected image.

Subsequently, in step S54, the polar coordinate system (R, θ') is converted to a (X,Y) coordinate system. This conversion can be performed using the following equations (7) and (8).

$$X = R \cos \theta' \quad (7)$$

$$Y = R \sin \theta' \quad (8)$$

In step S55, a data interpolation process is performed. Most of the image data after the coordinate conversion in step S54 is data on a position (between pixels) different from that of the grid-point like pixels. Therefore, it is necessary to produce image data at the pixel position by performing an interpolation process using the image data of the periphery of the pixel.

Figure 7:
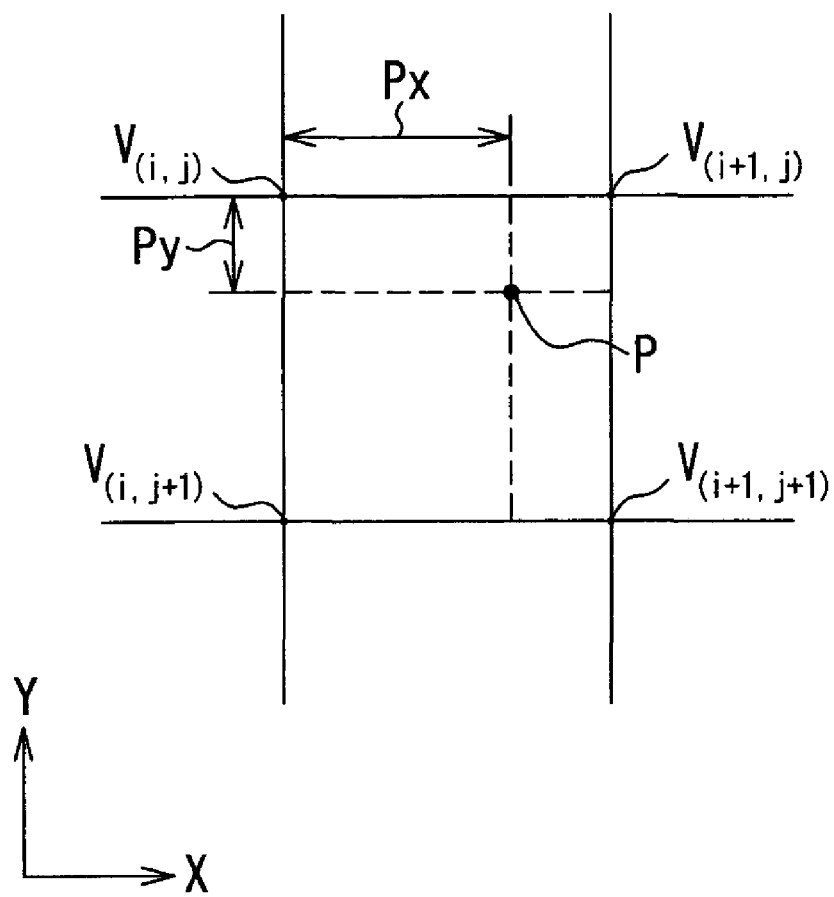
FIG. 7 is a diagram to explain an interpolation process of an image pickup device according to an embodiment of the present invention.

An example of the interpolation process will be described with reference to FIG. 7. Data $V_{(i,j)}$, $V_{(i+1,j)}$, $V_{(i,j+1)}$, $V_{(i+1,j+1)}$ at four points in the periphery of a pixel P is assumed to be obtained by the coordinate conversion in step S54. Using px, py (0≦px≦1, 0≦py≦1), that are the information on the position of the pixel P relative to the point having the data $V_{(i,j)}$, it is possible to determine the image data at the pixel P by the following formula (9).

$$px \cdot py(V_{(i,j)} - V_{(i+1,j)} - V_{(i,j+1)} + V_{(i+1,j+1)}) + px(V_{(i+1,j)} - V_{(i,j)}) + py(V_{i,j+1} - V_{(i,j)}) + V_{(i,j)} \quad (9)$$

It is to be understood that the foregoing is merely an example of the interpolation process, and an interpolation process different from the above may be performed. In this case also, similar effects can be obtained.

Then, the magnification correcting process (step S50 of FIG. 2) ends.

In the above-described magnification correcting process, using an actually assembled image pickup device, the magnification or focal length of each of the plurality of imaging optical systems is measured directly, and using the information, the magnifications of the plurality of images are equalized. However, the present invention is not limited thereto. For example, when the magnification or focal length of each imaging optical system is considered to be substantially equal to its design value, the magnification correcting process may be performed using the design value. In this case also, effects similar to the above can be obtained.

Embodiment 2

In Embodiment 2, the rotation correcting process (step S60 of FIG. 2) for equalizing the inclination among the plurality of images will be described.

Figure 8:
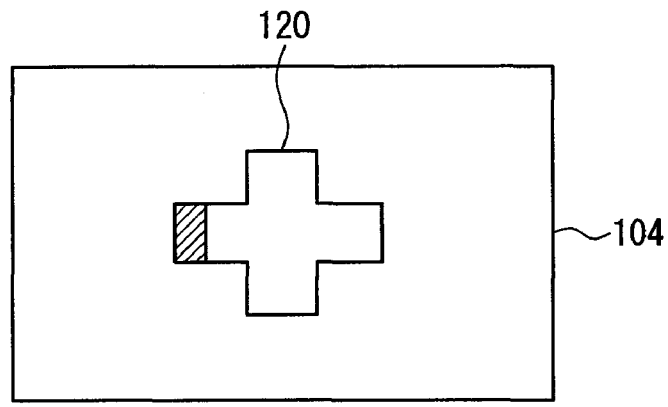
FIG. 8 shows diagrams illustrating an example of the positional relationship between an object image and each image sensor in an image pickup device according to an embodiment of the present invention.
Figure 8:
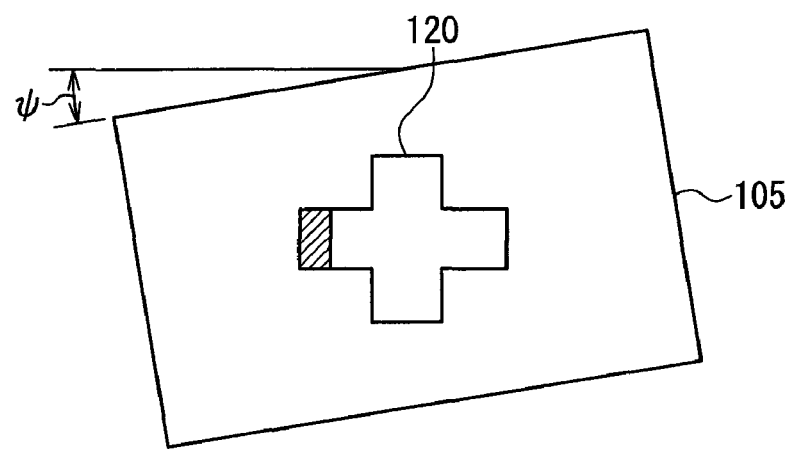
Figure 8:
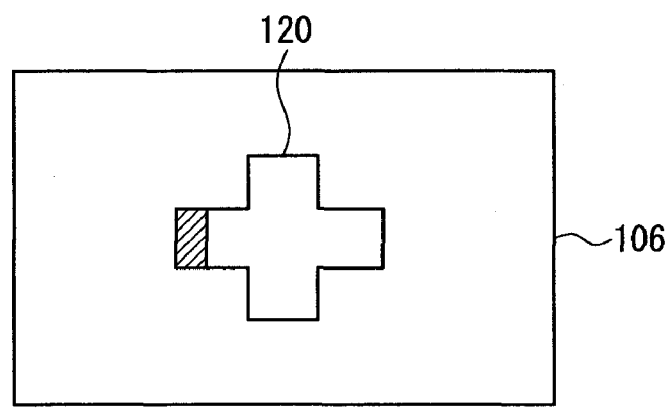

The reason why a variation in inclination (rotation angle) occurs among the plurality of images first is described with reference to FIG. 8. FIG. 8 shows diagrams illustrating the positional relationship between the plurality of image sensors 104, 105, 106 and the object image shown in FIG. 1, as viewed from the object side. The same reference numerals are given to the same components of FIG. 1. A case will be described in which a cross-shaped object is captured. As shown, a cross-shaped object image 120 is formed on each of the image sensors 104, 105 and 106. By way of example, in this case, the image sensor 105 is assumed to be inclined at an angle Ψ relative to the image sensors 104 and 106. This envisages that a variation occurs when the image sensors 104, 105 and 106 are mounted on the same substrate.

Figure 9:
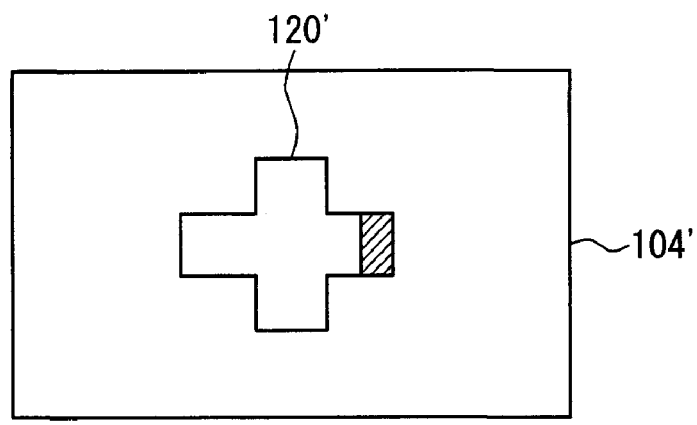
FIG. 9 shows diagrams illustrating an example of the images obtained via image sensors in an image pickup device according to an embodiment of the present invention.
Figure 9:
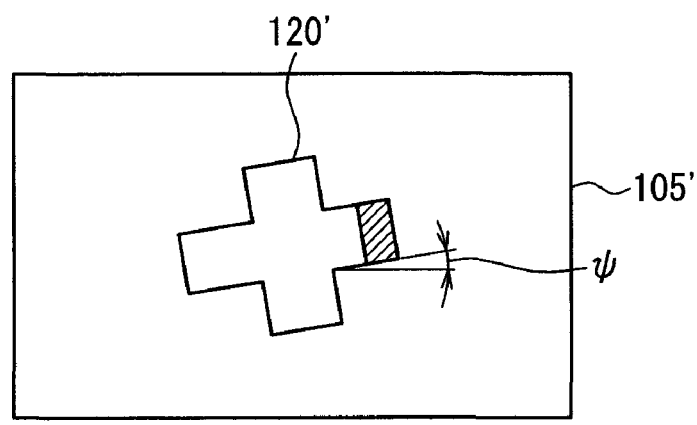
Figure 9:
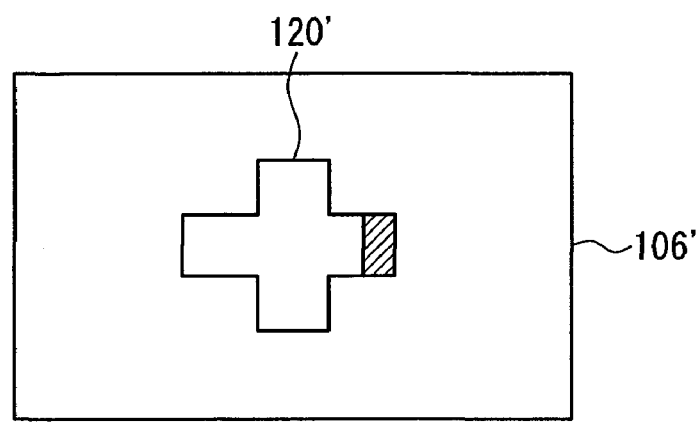

FIG. 9 shows diagrams illustrating the results of the object images captured by the image sensors 104, 105 and 106 and displayed on a separate display device (e.g., display) through the R signal processing circuit 107, the G signal processing circuit 108 and the B signal processing circuit 109. The displayed images 104', 105' and 106' correspond to the image sensors 104, 105 and 106, respectively. As can be seen from FIG. 9, the object image 120' captured by the image sensor 105 is rotated at an angle Ψ relative to the object images 120' captured by other image sensors 104 and 106. Even if these three images are subjected only to the parallax correction (i.e., the correction in which the images are moved in parallel only by the amount of parallax of the plurality of imaging optical systems 101, 102 and 103) and are then superimposed, it is impossible to superimpose the image 120' of the image sensor 105 on the images 120' of other image sensors 104 and 106.

For this reason, before the parallax correction process and the image combining process, it is preferable to perform the rotation correcting process (step S60 of FIG. 2) for equalizing the inclination among the plurality of images.

An example of the rotation correcting process in which the pre-image processing circuit 111 eliminates the difference in inclination among the plurality of images is shown below.

First, when assembling the image pickup device, an adjustment image having a significantly large contrast difference is captured as an object. For example, a black cross with a white background is captured. Considering the magnification of the optical systems, it is preferable that this cross has a line width not less than twice the pixel pitch of the image sensors 104, 105 and 106. Also, the intersection point of the cross needs to be matched with the center of the imaging optical system 101, 102, 103.

When the image sensors 104, 105, 106 and the imaging optical systems 101, 102, 103 are mounted, the centers of the imaging optical systems 101, 102, 103 and the centers of the image sensors 104, 105, 106 are already aligned with each other by a mechanical adjustment or software adjustment. The variation in the inclination (rotation angle) when each of the image sensors 104, 105 and 106 is mounted is displayed as an image outputted from each image sensor 104, 105, 106.

Figure 10A:
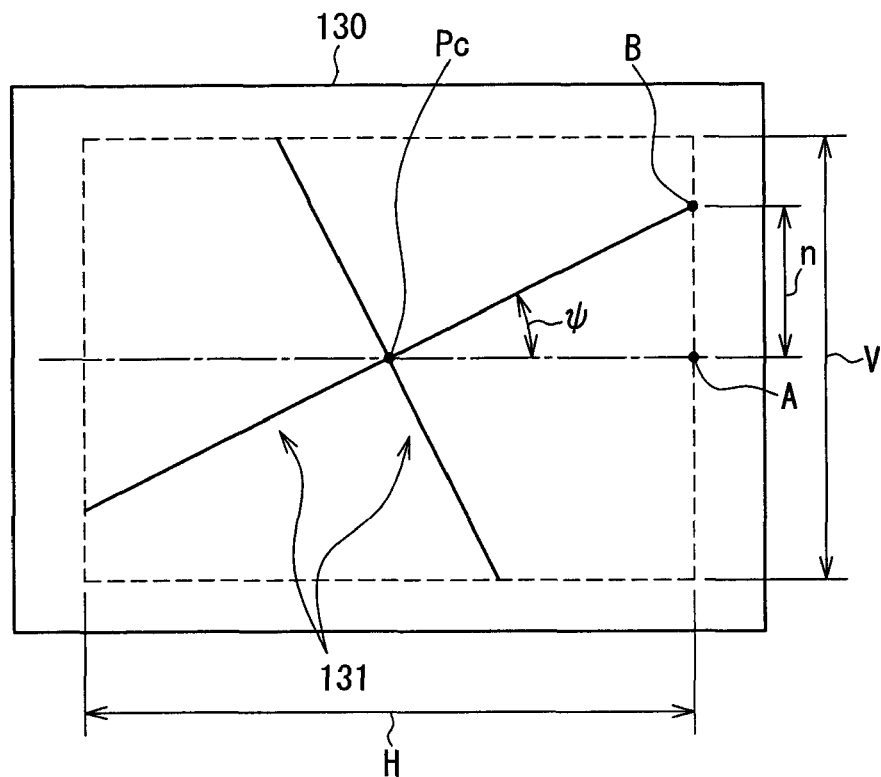
FIG. 10A is a diagram to explain a method for detecting the rotation angle of an image sensor of an image pickup device according to an embodiment of the present invention.
Figure 10B:
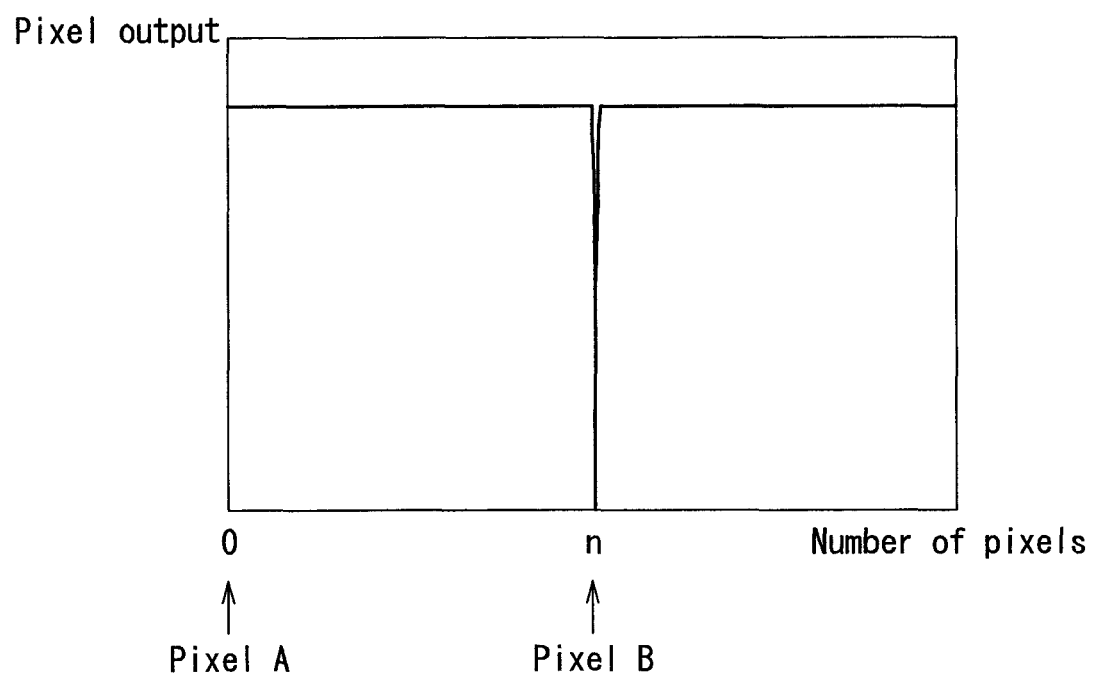
FIG. 10B is a diagram to explain a method for detecting the rotation angle of an image sensor of an image pickup device according to an embodiment of the present invention.

An example of the method for detecting the rotation angle of an output image when a cross is used as an object will be described with reference to FIGS. 10A and 10B. As shown in FIG. 10A, a cross 131 is displayed on a display device 130 having H pixels in the lateral direction and V pixels in the vertical direction, with the cross being rotated at a rotation angle Ψ about the origin point Pc as the center. In this image, using a pixel A away by H/2 pixels from the origin point Pc in the horizontal direction as the reference, the output value from each pixel located in a vertical direction from the pixel A is detected. The outline of the detection result of the output values from the pixels is shown in FIG. 10B. In FIG. 10B, the lateral axis represents the number of pixels in a vertical direction from the pixel A, and the vertical axis represents the output value (pixel output) from the pixels. As shown, if a large change of the output value is detected in the pixel B (the nth pixel in a vertical direction from the pixel A), the rotation angle Ψ of the horizontal line of the cross relative to the horizontal direction of this image sensor is determined by the following equation (10).

$$\Psi = \tan^{-1}(2n/H) \quad (10)$$

The equation (10) is used when the pixel pitches in the horizontal direction and those in the vertical direction are equal. When the pixel pitches are different from each other, the multiplication of the ratio is necessary.

This measurement is performed for all the image sensors 104, 105 and 106, and the information on the inclination of each image sensor is stored in the recording unit 112 in the pre-image processing circuit 111 (see FIG. 1) as a default value (Ψ1, Ψ2, Ψ3). When capturing an image, the rotation correcting process (step S60 of FIG. 2) is performed for the plurality of images using this inclination information.

It is sufficient to perform the step of measuring the inclination of each image sensor only once during the initialization step of the assembly of the image pickup device or a product in which the image pickup device is incorporated.

As the rotation correcting process using the information on the inclination of the plurality of image sensors, there are two methods: one is to reconstruct a new image in the pre-image processing circuit 111, to replace the original image signal with the new image signal and to transfer it to the subsequent image combining process circuit 110; and another is to allow the pre-image processing circuit 111 to control only the inclination information and to transfer the image signal together with the inclination information to the subsequent image combining process circuit 110. Because in either case, similar effects are obtained with respect to the inclination correction of the images, no problem arises if either method is selected. In the following, a description will be given focusing on the former method.

Figure 11:
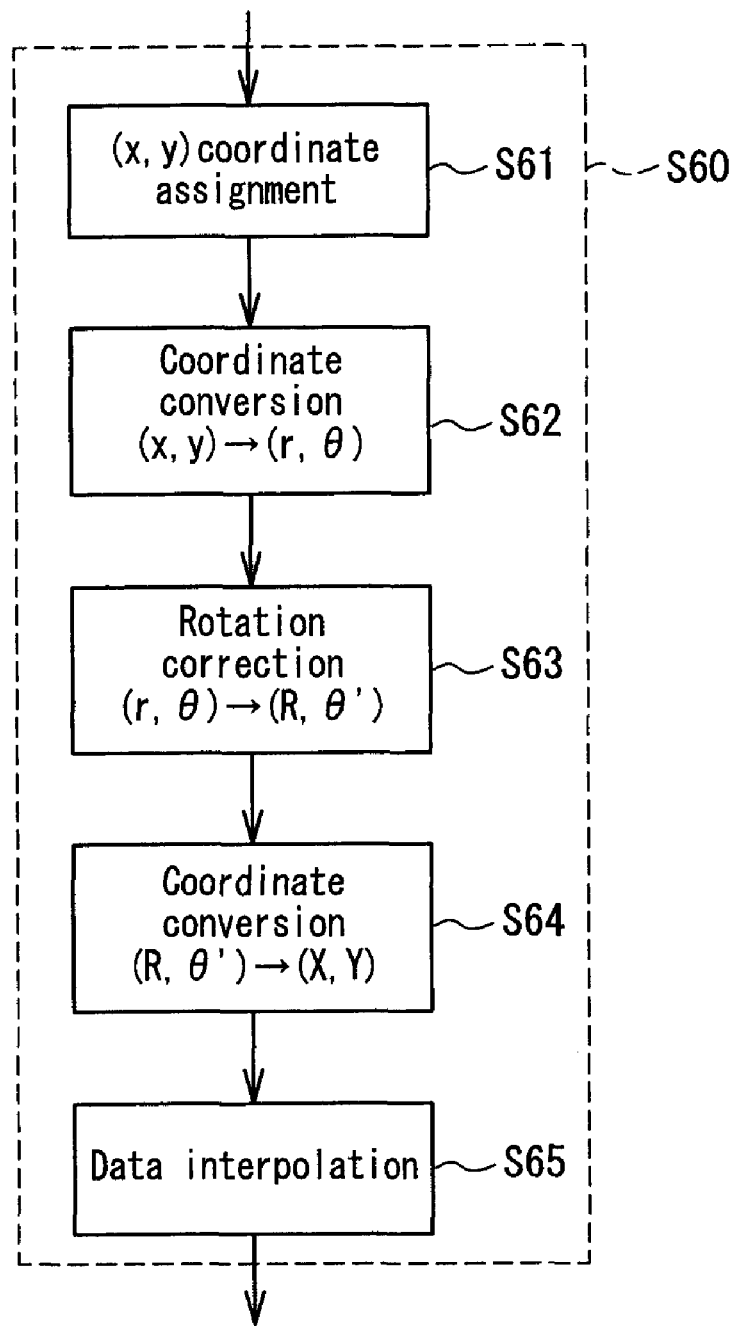
FIG. 11 is a flowchart showing the algorithm of a rotation correcting process for an image pickup device according to an embodiment of the present invention.

With reference to FIG. 11, a description will be given of an example of the rotation correcting process (step S60 of FIG. 2) that is performed every time image capturing is carried out.

In step S61, a plurality of images (the outputs of PDs) captured via the plurality of imaging optical systems are stored temporarily in a two-dimensional information recording unit (not shown) of the pre-image processing circuit 111, and a coordinate (x, y) whose origin point is set at the origin point extracted in the origin point correcting process in step S40 (see FIG. 2) is assigned to the pixels forming each image.

In step S62, the (x, y) coordinate system is converted to a (r, θ) polar coordinate system whose origin point is at the center. This conversion can be performed easily by a coordinate conversion method using the following equations (3) and (4).

$$r = (x^2 + y^2)^{1/2} \quad (3)$$

$$\theta = \cos^{-1}(x/(x^2+y^2)^{1/2}) \quad (4)$$

In step S63, the rotation correction is performed. By the inclining angle Ψi(i=1, 2, 3) of the image sensor 104, 105, 106 stored in the recording unit 112, the coordinate (r, θ) is converted to a coordinate (R, θ') using the following equations (11) and (12).

$$R = r \quad (11)$$

$$\theta' = \theta \Psi i \quad (12)$$

By subjecting all the pixels forming an image to the coordinate conversion using the equations (11) and (12), it is possible to obtain a rotation-corrected image.

Subsequently, in step S64, the polar coordinate system (R, θ') is converted to a (X, Y) coordinate system. This conversion can be performed using the following equations (7) and (8).

$$X = R \cos \theta' \quad (7)$$

$$Y = R \sin \theta' \quad (8)$$

In step S65, a data interpolation process is performed. Most of the image data after the coordinate conversion in step S64 is data on a position (between pixels) different from that of the grid-point like pixels. Therefore, it is necessary to produce image data at the pixel position by performing an interpolation process using the image data of the periphery of the pixel.

An example of the interpolation process will be described with reference to FIG. 7. Data $V_{(i,j)}$, $V_{(i+1,j)}$, $V_{(i,j+1)}$, $V_{(i+1,j+1)}$ at four points in the periphery of a pixel P is assumed to be obtained by the coordinate conversion in step S64. Using px, py ($0 \leq px \leq$, $0 \leq py \leq 1$), that are the information on the position of the pixel P relative to the point having the data $V_{(i,j)}$, it is possible to determine the image data at the pixel P by the following formula (9).

$$px \cdot py(V_{(i,j)} - V_{(i+1,j)} - V_{(i,j+1)} + V_{(i+1,j+1)}) + px(V_{(i+1,j)} - V_{(i,j)}) + py(V_{(i,j+1)} - V_{(i,j)}) + V_{(i,j)} \quad (9)$$

It is to be understood that the foregoing is merely an example of the interpolation process, and an interpolation process different from the above may be performed. In this case also, similar effects can be obtained.

Then, the rotation correcting process (step S60 of FIG. 2) ends.

In the above rotation correcting process, using an actually assembled image pickup device, the rotation angle of each of the plurality of images outputted from the plurality of image sensors is measured directly, and using the information, the inclinations of the plurality of images are equalized. However, the present invention is not limited thereto. For example, when assembling, the rotation angle of the plurality of image sensors is measured, and the rotation correcting process may be performed using the measured values. In this case also, effects similar to the above can be obtained.

Embodiment 3

In Embodiment 3, the distortion correcting process (step S70 of FIG. 2) for equalizing the distortion of the plurality of images will be described.

Ordinary optical lenses exhibit a phenomenon (which is called "distortion") that causes the image of a linear object to appear in a deformed state such as a curve in the periphery of the imaging area. An example of the distortion caused by the imaging optical systems of the image pickup device of the present invention will be described with reference to FIGS. 12A to 12D.

Figure 12A:
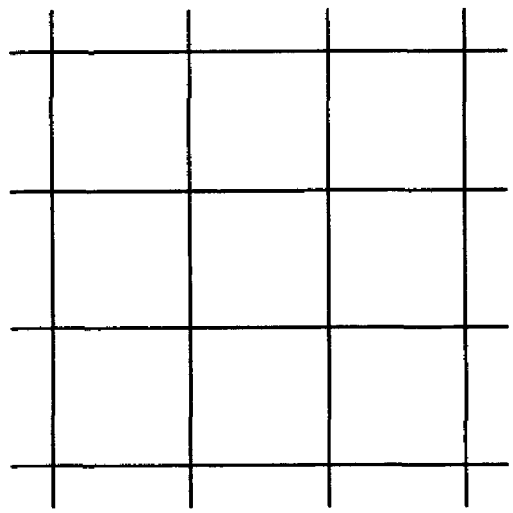
FIG. 12A is a diagram illustrating a grid-like object.
Figure 12B:
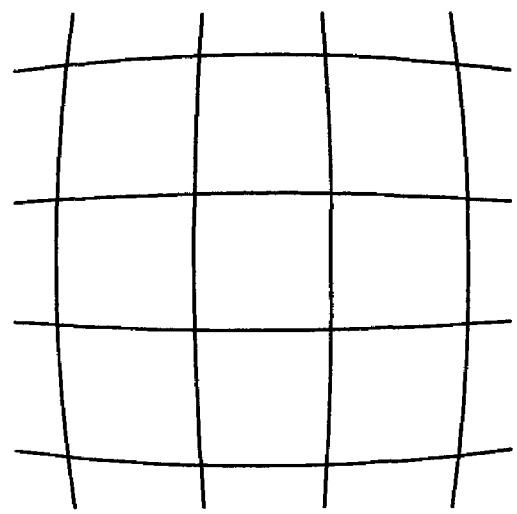
FIG. 12B is a diagram illustrating a grid-like object image captured via a first imaging optical system of an image pickup device according to an embodiment of the present invention.
Figure 12C:
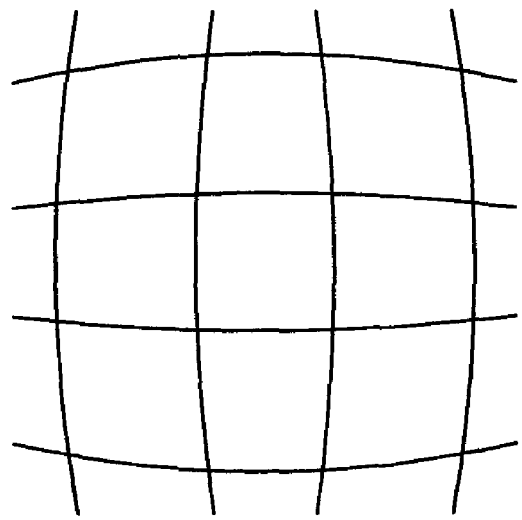
FIG. 12C is a diagram illustrating a grid-like object image captured via a second imaging optical system of an image pickup device according to an embodiment of the present invention.
Figure 12D:
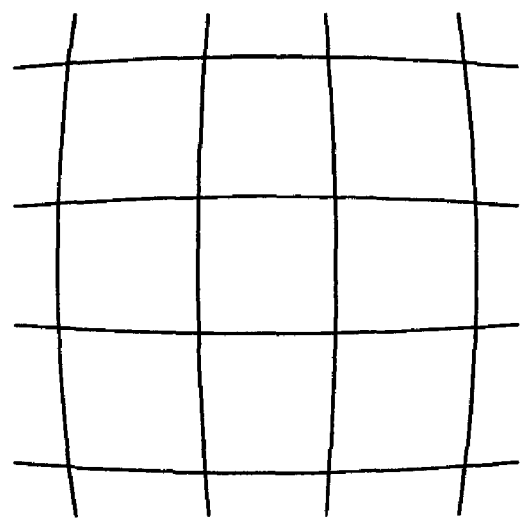
FIG. 12D is a diagram illustrating a grid-like object image captured via a third imaging optical system of an image pickup device according to an embodiment of the present invention.

FIG. 12A shows a grid-like object. FIG. 12B is an image of the grid-like object of FIG. 12A captured by the image sensor 104 via the imaging optical system 101. FIG. 12C is an image of the grid-like object of FIG. 12A captured by the image sensor 105 via the imaging optical system 102. FIG. 12D is an image of the grid-like object of FIG. 12A captured by the image sensor 106 via the imaging optical system 103. All the images of FIGS. 12B to 12D are deformed into barrel shapes as compared to the object shown in FIG. 12A. Further, although the image of FIG. 12B is substantially the same as that of FIG. 12D, these images are slightly different in shape from the image of FIG. 12C, and the image of FIG. 12C has a larger distortion than the images of FIGS. 12B and FIG. 12D.

If these three images having different degrees of distortion are combined, the resolution of the combined image decreases significantly with the increase in the degree of distortion. Accordingly, the variations in distortion among the plurality of images also are a large problem in image pickup devices having a plurality of optical systems.

For this reason, before the parallax correction process and the image combining process, it is preferable to perform the distortion correcting process (step 70 of FIG. 2) for equalizing the distortion among the plurality of images.

An example of the distortion correcting process in which the pre-image processing circuit 111 eliminates the difference in distortion among the plurality of images is shown below.

First, when assembling the image pickup device, the amount of distortion of each imaging optical system is measured. The information is stored in the recording unit 112 of the pre-image processing circuit 111 (see FIG. 1) as a default value. When the actual amount of distortion of each imaging optical system is considered to be substantially equal to its design value, the design value may be stored in the recording unit 112 (see FIG. 1).

An example of the method for measuring the amount of distortion of each imaging optical system when assembling the image pickup device will be shown.

Figure 13:
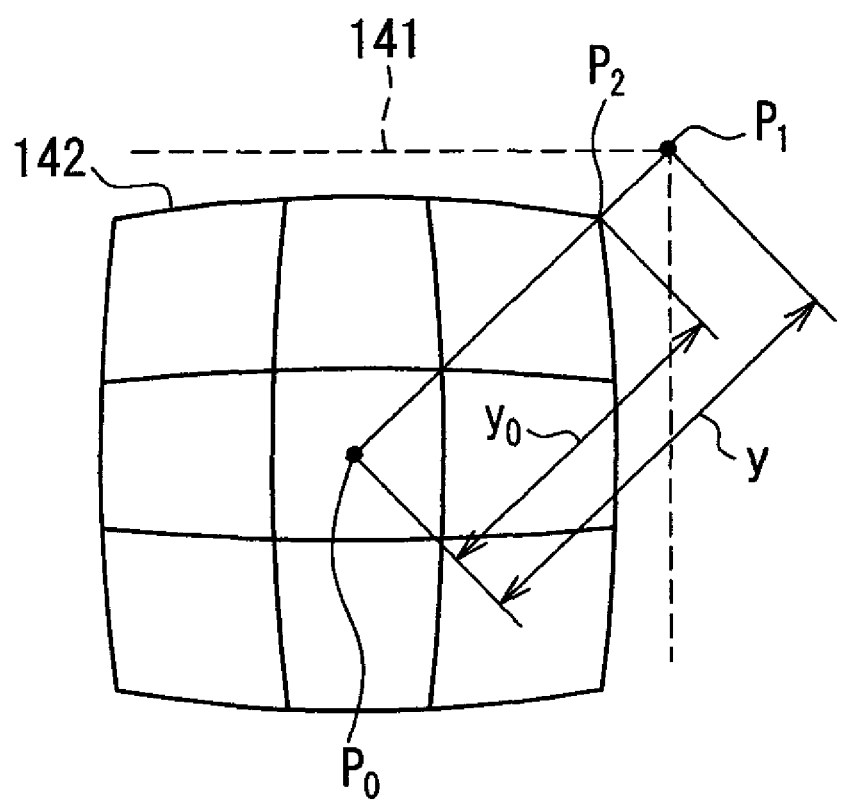
FIG. 13 is a diagram to explain a method for detecting the amount of distortion of an imaging optical system of an image pickup device according to an embodiment of the present invention.

The amount of distortion of the imaging optical systems can be measured from an image obtained from each image sensor by capturing the grid-like object of FIG. 12A formed by a plurality of straight lines intersecting perpendicular to each other. For example, the output image from an image sensor is assumed to be as shown by solid lines 142 of FIG. 13. In FIG. 13, part of the grid-like object expanded (or contracted) considering the magnification of the imaging optical system also is shown by dashed lines 141. The point $P_1$ on the object 141 corresponds to the point $P_2$ on the output image 142. The point $P_0$ represents the position of the optical axis. The distance y from the optical axis $P_0$ to the point $P_1$ on the object 141 changes into the distance $y_0$ from the optical axis $P_0$ to the point $P_2$ on the output image 142 by the aberration of the imaging optical system. The amount of distortion D of the imaging optical system in this case can be determined by the following equation (13).

$$D(y)=(y_0-y)/y \tag{13}$$

This measurement is performed for all the imaging optical systems 101, 102 and 103, and the information on the amount of distortion of each imaging optical system 101, 102, 103 is stored in the recording unit 112 in the pre-image processing circuit 111 (see FIG. 1) as a default value (D1(y), D2(y), D3(y)). When capturing an image, the distortion correcting process (step S70 of FIG. 2) is performed for the plurality of images using this information on the amount of distortion.

It is sufficient to perform the step of measuring the amount of distortion of each imaging optical system only once during the initialization step of the assembly of the image pickup device or a product in which the image pickup device is incorporated.

As the distortion correcting process using the information on the amount of distortion of the plurality of imaging optical systems, there are two methods: one is to reconstruct a new image in the pre-image processing circuit 111, to replace the original image signal with the new image signal and to transfer it to the subsequent image combining process circuit 110; and another is to allow the pre-image processing circuit 111 to control only the information on the amount of distortion and to transfer the image signal together with the information on the amount of distortion to the subsequent image combining process circuit 110. Because in either case, similar effects are obtained with respect to the distortion correction of the images, no problem arises if either method is selected. In the following, a description will be given focusing on the former method.

Figure 14:
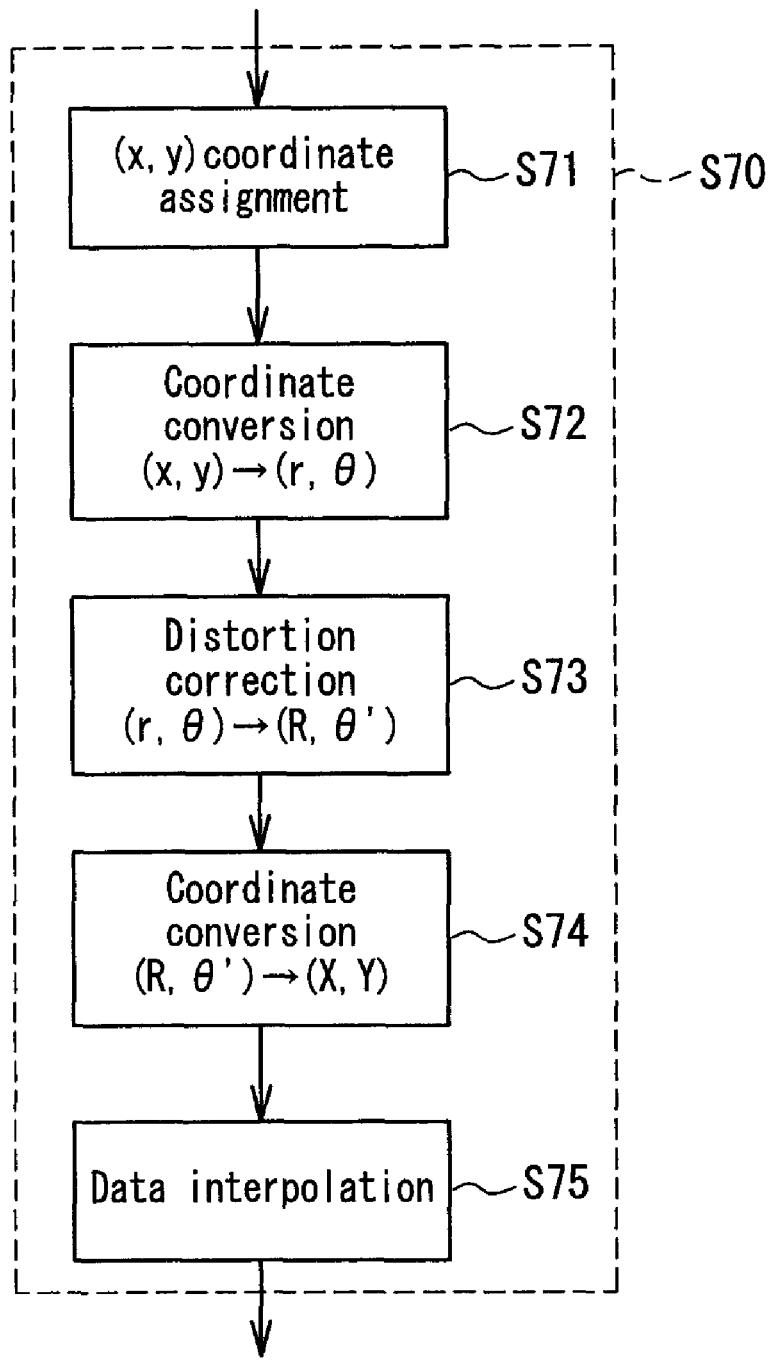
FIG. 14 is a flowchart showing the algorithm of distortion correcting process of an image pickup device according to an embodiment of the present invention.

With reference to FIG. 14, a description will be given of an example of the distortion correcting process (step S70 of FIG. 2) that is performed every time image capturing is carried out.

In step S71, a plurality of images (the outputs of PDs) captured using the plurality of imaging optical systems are stored temporarily in a two-dimensional information recording unit (not shown) of the pre-image processing circuit 111, and a coordinate (x, y) whose origin point is set at the origin point extracted in the origin point correcting process in step S40 (see FIG. 2) is assigned to the pixels forming each image.

In step S72, the (x, y) coordinate system is converted to a (r, θ) polar coordinate system whose origin point is at the center. This conversion can be performed easily by a coordinate conversion method using the following equations (3) and (4).

$$r=(x^2+y^2)^{1/2} \tag{3}$$

$$\theta=\cos^{-1}(x/(x^2+y^2)^{1/2}) \tag{4}$$

In step S73, a distortion correction is performed. By the amount of distortion Di(r)(i=1, 2, 3) of the imaging optical system stored in the recording unit 112, the coordinate (r, θ) is converted to a coordinate (R, θ') using the following equations (14) and (6).

$$R=(Di(r)+1)\cdot r \tag{14}$$

$$\theta'=\theta \tag{6}$$

By subjecting all the pixels forming an image to the coordinate conversion using the equations (14) and (6), it is possible to obtain a distortion-corrected image.

Subsequently, in step S74, the polar coordinate system (R, θ') is converted to a (X, Y) coordinate system. This conversion can be performed using the following equations (7) and (8).

$$X=R\cos\theta' \tag{7}$$

$$Y=R\sin\theta' \tag{8}$$

In step S75, a data interpolation process is performed. Most of the image data after the coordinate conversion in step S74 is data on a position (between pixels) different from that of the grid-point like pixels. Therefore, it is necessary to produce image data at the pixel position by performing an interpolation process using the image data of the periphery of the pixel.

An example of the interpolation process will be described with reference to FIG. 7. Data $V_{(i,j)}$, $V_{(i+1,j)}$, $V_{(i,j+1)}$, $V_{(i+1,j+1)}$ at four points in the periphery of a pixel P is assumed to be obtained by the coordinate conversion in step S74. Using px, py ($0 \leq px \leq 1$, $0 \leq py < 1$), that are the information on the position of the pixel P relative to the point having the data $V_{(i,j)}$, it is possible to determine the image data at the pixel P by the following formula (9).

$$px\cdot py(V_{(i,j)}-V_{(i+1,j)}-V_{(i,j+1)}+V_{(i+1,j+1)})+px(V_{(i+1,j)}-V_{(i,j)})+py(V_{i,j+1}-V_{(i,j)})+V_{(i,j)} \tag{9}$$

It is to be understood that the foregoing is merely an example of the interpolation process, and an interpolation process different from the above may be performed. In this case also, similar effects can be obtained.

Then, the distortion correcting process (step S70 of FIG. 2) ends.

In the above-described distortion correcting process, using an actually assembled image pickup device, the amount of distortion of each of the plurality of imaging optical systems is measured directly, and using the information, the distortions of the plurality of images are equalized. However, the present invention is not limited thereto. For example, when the amount of distortion of each imaging optical system is considered to be substantially equal to its design value, the distortion correcting process may be performed using the design value. In this case also, effects similar to the above can be obtained.

In the distortion correcting process described above, it is preferable that the distortions of the plurality of images are equalized such that the amount of distortion of each of the plurality of imaging optical systems corresponds with a very small reference distortion value. In this case, the reference amount of distortion may be the smallest one of the amounts of distortion of the plurality of imaging optical systems, or may be an amount of distortion much smaller than the amounts of distortion of the plurality of imaging optical systems. Thereby, it is possible to obtain a sufficiently distortion-corrected combined image as an additional effect. Further, because there is no need for the imaging optical systems to have a necessary distortion performance, designing of the imaging optical systems become easy, and it is also possible to realize unprecedentedly thin imaging optical systems.

Furthermore, as described above, in the case of acquiring only information on the distance to an object without performing the combining process of a plurality of images, it is preferable to determine the amount of parallax using a plurality of images not having subjected to the distortion correcting process, to correct the obtained amount of parallax using the amount of distortion, and to determine information on the distance to an object by computation using the corrected amount of parallax. In this case, only the amount of distortion at a specific pixel used to determine the amount of parallax needs to be considered, and therefore the computation time can be shortened. On the other hand, in the case of determining the amount of parallax from a plurality of distortion-corrected images after the distortion correcting process, in the distortion correcting process of the images, the computation for distortion correction is necessary to perform on all the pixel data, and therefore long computation time is necessary. However, in the case of determining the amount of parallax without performing the distortion correcting process, it is preferable that the variation in the amount of distortion among the plurality of imaging optical systems is about not greater than ±5%. When the variation in the amount of distortion is greater than ±5%, the computation for determining the amount of parallax from a plurality of images may not function properly, and the possibility increases that an accurate amount of parallax may not be obtained.

In order to perform the magnification correcting process (step S50), the rotation correcting process (step S60) and the distortion correcting process (step S70) shown in FIG. 2 every time image capturing is carried out by the image pickup device of the present invention, it is preferable to perform, during the process of producing or assembling the image pickup device, the step (the step of setting default value for magnification) of measuring the magnification or focal length of each of the plurality of imaging optical systems and storing it as a default value in the recording unit 112, the step (the step of setting default value for inclination) of measuring the inclination of each of the plurality of image sensors and storing it as a default value in the recording unit 112, and the step (the step of setting default value for distortion) of measuring the distortion of each of the plurality of imaging optical systems and storing it as a default value in the recording unit 112.

A preferred procedure for performing these three default value setting steps will be described below.

In the step of setting default value for inclination, by using an appropriate object such as a cross-shaped object as described in Embodiment 2, even when a variation occurs in magnification and distortion among a plurality of captured images, the inclination measurement can be performed accurately regardless of the variation. Therefore, it is preferable to perform the step of setting the default value firstly.

In the step of setting the default value for distortion, as described in Embodiment 3, a comparison is made between the captured image 142 and the object 141 (see FIG. 13). The comparison requires the information on the magnification or focal length of the imaging optical system. Therefore, it is preferable to perform the step of setting the default value for magnification prior to the step of setting default value for distortion.

Therefore, it is preferable to perform the step of setting the default value for inclination, the step of setting the default value for magnification and the step of setting the default value for distortion in this order.

However, by changing the object, it is also possible to reverse the above-described order of the step of setting the default value for inclination and the step of setting the default value for magnification, or to perform them simultaneously.

An example of the object that can be used to simultaneously perform the step of setting the default value for inclination and the step of setting the default value for magnification will be shown below.

This object comprises a first straight line and a second straight line intersecting perpendicular to each other. The first straight line is parallel to the horizontal direction. It is preferable that the first straight line has a length long enough to extend beyond the viewing field of the imaging optical system. This first straight line is used to measure the inclination of the image sensor (see FIG. 10A). The second line preferably is parallel to the vertical direction. It is preferable that the second straight line has a length that extends within the viewing field of the imaging optical system. More specifically, it is preferable to set the length such that the length of an image formed on the image sensor is about 80% of the length of the vertical sides (short sides) of the effective imaging region of this image sensor. It is preferable to set the line widths of the first and second straight lines such that the line width of an image formed on the image sensor is not less than twice the pixel pitch of the image sensor. In order to increase the contrast ratio significantly, the color of the first and second straight lines preferably is black, and that of the background preferably is white. For the measurement, it is necessary to adjust the relative position between the object and the image pickup device such that an image of the intersection point of the first and second straight lines is formed on the reference point (origin point) used in the image combining process of the image pickup device. Usually, the origin point is a point at which an image of an object located in infinity is formed.

In the embodiments given above, the three-lens image pickup device (the image pickup device having three imaging optical systems and three image sensors) was described, but the image pickup device of the present invention is not limited thereto. For example, the image pickup device of the present invention can be an image pickup device having two lenses, four lenses or more. In this case also, effects similar to the above can be obtained.

Particularly, with the use of an image pickup device having not less than four lenses, it is possible to acquire two images of the same color by two lenses, and to acquire also a red image, a blue image and a green image that are necessary to obtain a color combined image. In this case, two images of the same color (normally, green images are preferable) are compared and the amount of parallax between these images is determined, whereby the computation process of the amount of parallax will be simplified significantly. Also, the accuracy for combining the plurality of images and the accuracy for computing the distance to the object are improved significantly.

In order to perform the same process using the three-lens image pickup device as that of the four-lens image pickup device described above, a process is necessary in which, from the information of any one (e.g., red or blue image) of the acquired red, blue and green images, the information of another color image (e.g., green image) is extracted by interpolation.

In the embodiments given above, examples were described in which the plurality of image sensors correspond one to one to the plurality of imaging optical systems, but the image pickup device of the present invention is not limited thereto. For example, it is also possible to use one image sensor that commonly corresponds to a plurality of imaging optical systems, and divide this image sensor into a plurality of imaging regions that correspond one to one to the plurality of imaging optical systems.

In the embodiments given above, the image pickup device that performs the magnification correcting process (step S50), the rotation correcting process (step S60) and the distortion correcting process (step S70) shown in FIG. 2 in this order every time image capturing is carried out was described, but the order of these three correcting processes is not limited thereto. It is also possible to skip one or two of these three correcting processes. For example, as described above, when one image sensor commonly corresponding to a plurality of imaging optical systems is used, the rotation correcting process (step S60) can be skipped.

It is to be understood that the embodiments described above only are intended to clarify the technical concept of the present invention, and the present invention is not construed as being limited to the specific examples given herein and may be carried out with various modifications without departing from the spirit and scope of the invention, and the present invention should be construed broadly.

INDUSTRIAL APPLICABILITY

Although the applications of the image pickup device of the present invention are not specifically limited, because the image pickup device of the present invention can capture an image of high quality even though the size in the optical axis direction is small, it is useful, for example, as a camera module for portable equipment or the like.

The invention claimed is:

1. An image pickup device comprising:
a plurality of imaging optical systems;
a plurality of imaging regions that correspond one to one to the plurality of imaging optical systems and capture a plurality of images via the plurality of imaging optical systems, respectively; and
an image processing means for performing image processing in which the inclination of the plurality of captured images is equalized, performing image processing in which the magnification of the plurality of inclination-equalized images is equalized, performing image processing in which the distortion of the plurality of magnification-equalized images is equalized, and performing image processing in which the amount of parallax among the plurality of distortion-equalized images is calculated.

2. The image pickup device according to claim 1, further comprising a recording unit that stores information on the magnification of the plurality of imaging optical systems,
wherein the image processing means equalizes the magnification of the plurality of images using the magnification information of the plurality of imaging optical systems.

3. The image pickup device according to claim 1, further comprising a recording unit that stores information on the focal length of the plurality of imaging optical systems,
wherein the image processing means equalizes the magnification of the plurality of images using the focal length information of the plurality of imaging optical systems.

4. The image pickup device according to claim 1, further comprising a recording unit that stores information on the inclination of the plurality of imaging regions,
wherein the image processing means equalizes the inclination of the plurality of images using the inclination information of the plurality of imaging regions.

5. The image pickup device according to claim 1, further comprising a recording unit that stores information on the amount of distortion of the plurality of imaging optical systems,
wherein the processing means equalizes the distortion of the plurality of images using the information on the amount of distortion of the plurality of imaging optical systems.

6. An image pickup device comprising:
a plurality of imaging optical systems;
a plurality of imaging regions that correspond one to one to the plurality of imaging optical systems and capture a plurality of images via the plurality of imaging optical systems, respectively; and
an image processing means for performing image processing in which the magnification of the plurality of captured images is equalized, performing image processing in which the distortion of the plurality of magnification-equalized images is equalized, and performing image processing in which the amount of parallax among the plurality of distortion-equalized images is calculated.

7. An image processing method for calculating the amount of parallax from a plurality of images having a parallax relationship to one another, comprising the steps of:
performing image processing in which the magnification of the plurality of images is equalized;
performing image processing in which the magnification of the plurality of inclination-equalized images is equalized;
performing image processing in which the distortion of the plurality of magnification-equalized images is equalized; and
performing image processing in which the amount of parallax among the plurality of distortion-equalized images is calculated.

8. An image processing method for calculating the amount of parallax from a plurality of images having a parallax relationship to one another, comprising the steps of:
performing image processing in which the magnification of the plurality of images is equalized;
performing image processing in which the distortion of the plurality of magnification-equalized images is equalized; and
performing image processing in which the amount of parallax among the plurality of distortion-equalized images is calculated.

* * * * *